United States Patent
Liu (10) Patent No.: US 7,613,482 B2
(45) Date of Patent: Nov. 3, 2009

(54) METHOD AND SYSTEM FOR STEERING ANTENNA BEAM

(75) Inventor: I-Ru Liu, Taipei (TW)

(73) Assignee: Accton Technology Corporation, Hsinchu (TW)

( * ) Notice: Subject to any disclaimer, the term of this patent is extended or adjusted under 35 U.S.C. 154(b) by 714 days.

(21) Appl. No.: 11/296,441

(22) Filed: Dec. 8, 2005

(65) Prior Publication Data

US 2007/0135167 A1    Jun. 14, 2007

(51) Int. Cl.
*H04M 1/00* (2006.01)
(52) U.S. Cl. ............... 455/562.1; 455/83; 343/729; 343/751; 343/853; 343/893; 342/403; 342/423; 342/434; 342/447
(58) Field of Classification Search ............ 455/13.3, 455/19, 25, 63.4, 82, 83, 562.1, 121, 129, 455/193.1, 269; 343/811, 824, 724, 726, 343/729, 751, 835, 844, 853, 855, 879, 893; 342/403, 406, 423, 430, 434, 437, 445, 446, 342/447
See application file for complete search history.

(56) References Cited

U.S. PATENT DOCUMENTS 6,628,969 B1 * 9/2003 Rilling ................ 455/561
2002/0147032 A1 * 10/2002 Yoon et al. ............ 455/562
2003/0058155 A1 * 3/2003 Landt .................. 342/42
2003/0184473 A1 * 10/2003 Yu ...................... 342/380
2004/0046695 A1 * 3/2004 Brothers et al. ......... 342/427

\* cited by examiner

*Primary Examiner*—Duc Nguyen
*Assistant Examiner*—Dominic E Rego
(74) *Attorney, Agent, or Firm*—Bacon & Thomas, PLLC (57) ABSTRACT

A hybrid wireless network system is disclosed. The hybrid wireless network system includes an antenna array, an analog subsystem, and a digital subsystem. The antenna array at least includes two antenna elements. In the case of using multiple antenna elements to extend link range and coverage, a coarse-fine method is included for antenna elements selection. The analog subsystem calculates a difference signal and a sum signal based on the two RF signals. The analog subsystem includes step leveling devices. The digital subsystem estimates a direction-of-arrival (DOA) based on the sum signal and the difference signal. The step-leveling devices receive weights from the digital subsystem, in form of a feedback control, to apply the weights on the two RF signals respectively. The digital subsystem repetitively calculates new weights to update a beam pattern formed by the two RF signals until the DOA approaches null.

16 Claims, 12 Drawing Sheets

METHOD AND SYSTEM FOR STEERING ANTENNA BEAM

BACKGROUND OF THE INVENTION

1. Field of the Invention

The invention relates in general to a network system, and more particularly to an analog/digital hybrid wireless network system for steering antenna beam and the method therefor.

2. Description of the Related Art

The wide use of adaptive antennas lies in their ability in reducing received interference and enhancing transmitted signal by direction finding and beam forming. This improvement in reception and transmission leads to an increase in capacity and extension in link range.

Figure 1:
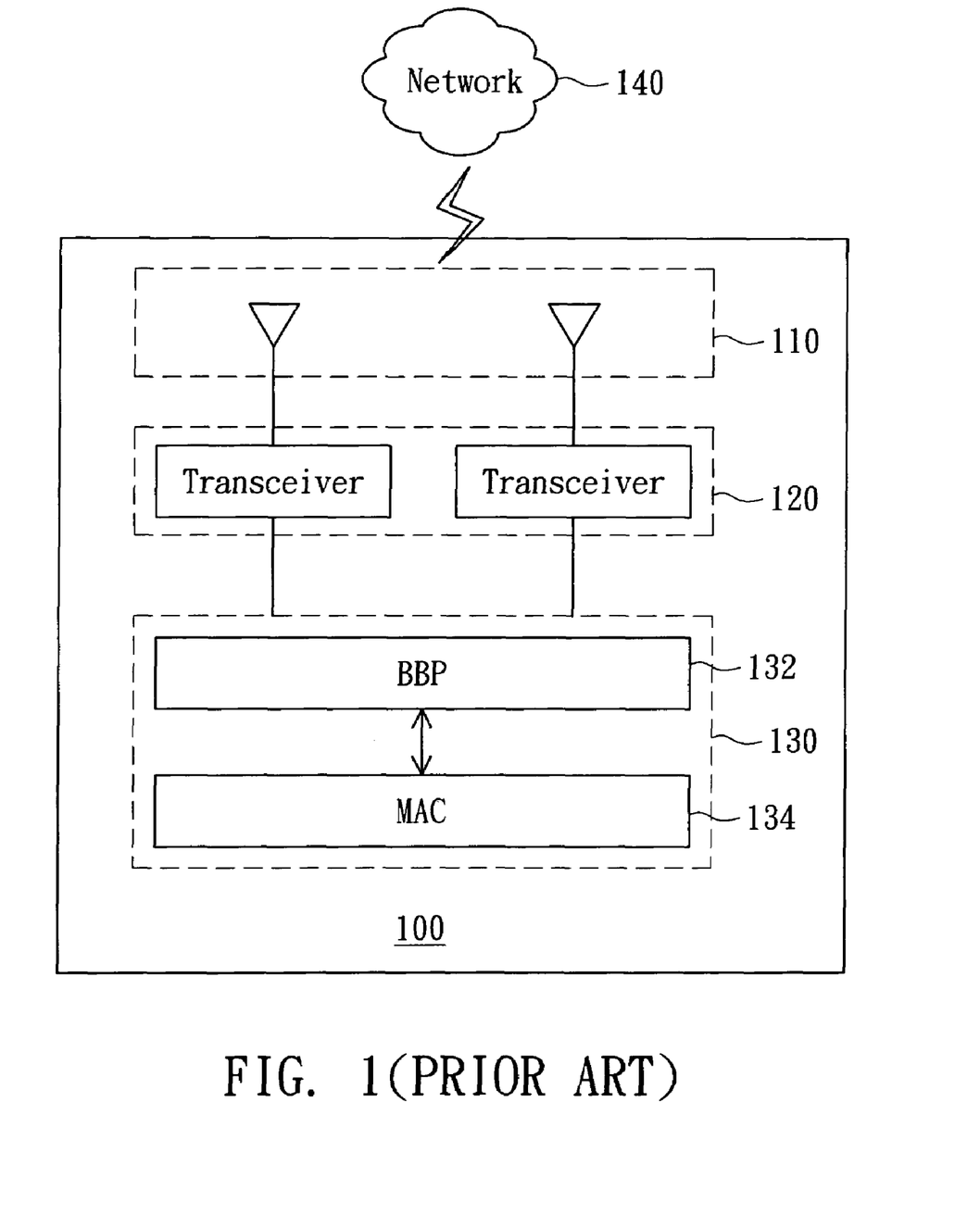
FIG. 1 shows a conventional network system with adaptive antennas.

FIG. 1 shows a conventional network system with adaptive antennas. The network system 100 includes an antenna array 110, dual transceivers 120 and a processor 130. The network system 100 is connected to a network 140, in which the antenna array 110 receives/transmits signals from/to the network 140. Dual transceivers 120 are used for simultaneous transmitting signals to the network 140 or for simultaneous receiving signals from the network 140. The processor 130 includes a baseband processor (BBP) 132 and a media access control (MAC) 134. Further, the BBP 132 is embedded with digital beamforming function, such that signals from the network can apply appropriate complex digital weights.

The conventional network system 100 provides a simple architecture towards extending link range. However, the use of complex (or vector) weights as opposed to real (or scalar) weights in beamforming increases both complexity and difficulty in tuning for adaptivity. Additionally, the use of dual transceivers complicates the issue of amplitude and phase tracking. The task-specific and integrated BBP/digital beamforming/MAC combination of processor 130 also limits its flexibility for performance upgrades and structure expansion.

Accordingly, there is a need to provide a less complex and more flexible wireless network system to extend link range.

SUMMARY OF THE INVENTION

It is therefore an object of the invention to solve the aforementioned prior-art difficulties to increase upgrade flexibility.

It is therefore another object of the invention to extend link range for a wireless network system.

The invention achieves the above-identified objects by providing a hybrid wireless network system for steering antenna beams. The hybrid wireless network system includes an antenna array, an analog subsystem, and a digital subsystem. The antenna array couples at least two radio-frequency (RF) signals to the analog subsystem. The analog subsystem calculates and outputs a difference signal and a sum signal based on the two RF signals. The analog subsystem includes step leveling devices. The digital subsystem estimates a direction-of-arrival (DOA) based on the sum signal and the difference signal. The step-leveling devices receive weights from the digital subsystem, in form of a feedback control, to apply the weights on the two RF signals respectively. The digital subsystem repetitively calculates and outputs new weights to update a beam pattern formed by the two RF signals until the DOA approaches null.

The invention achieves the above-identified objects by also providing a method for steering antenna beam. The method begins at receiving at least two RF signals based on initial weights via an antenna array. Then, a difference signal and a sum signal are calculated based on amplitudes of the two RF signals. Next, a polarity data is calculated based on the difference signal and the sum signal. And a direction-of-arrival (DOA) of the RF signals is estimated based on the polarity data and the difference signal. After the DOA has been estimated, then new weights are calculated based on the DOA, and applied on the two RF signals. Finally, a beam pattern formed by the two RF signals is continuously weighted using newly updated weights until the DOA approaches null.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 2:
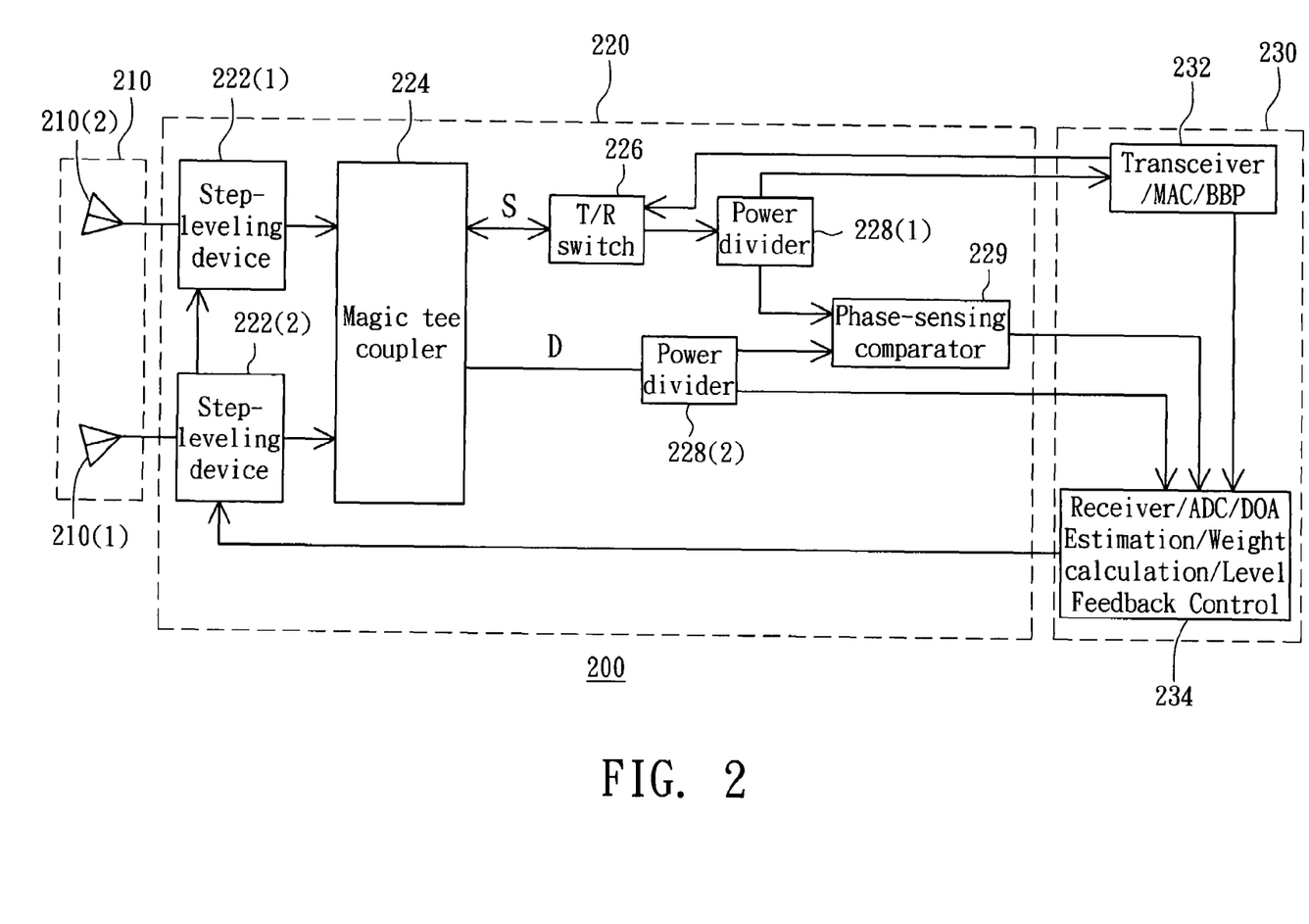
FIG. 2 shows illustration of a hybrid wireless device according to a first embodiment of the invention.

FIG. 2 shows illustration of an analog/digital hybrid wireless device with amplitude-compared antenna array according to a first embodiment of the invention. The hybrid wireless device 200 includes an amplitude-compared antenna array 210, an analog subsystem 220 and a digital subsystem 230.

Operatively, the antenna array 210 receives at least two RF signals from a network (not shown) via the antenna array 210. Based on the two received RF signals, the analog subsystem 220 calculates a difference signal D and a sum signal S, from which the digital subsystem 230 then estimates a direction-of-arrival (DOA) of an incoming signal based on the sum signal S and the difference signal D.

The analog subsystem 220 includes a step-leveling device 222(1) and 222(2), a magic-tee coupler 224, a transmitter/ receiver (T/R) switch 226, power dividers 228(1) and 228(2), and a phase-sensing comparator 229.

The digital subsystem 230 includes a first device 232 that includes a transceiver, a MAC (media access control) and a BBP (baseband processor), along with a second device 234 that includes a receiver, an ADC (analog-to-digital converter), a DOA estimator, a weight calculator, and a level feedback controller. The transceiver of the first device 232 performs the operation of signal modulation and digital-to-analog conversion.

Referring to the analog subsystem 220, the step-leveling devices 222(1) and 222(2) are for receiving weights from the digital subsystem 230, in form of feedback, to apply the weights on the two received RF signals. The step-leveling devices 222(1) and 222(2) are adjustable in terms of step levels. The magic-tee coupler 224 calculates the difference signal D and the sum signal S based on the amplitudes of the RF signals received from the antenna elements 210(1) and 210(2), respectively. The T/R switch 226 performs time-division-duplexing between the transmitter unit and receiver unit in the transceiver of the first device 232 and between the transmitter unit in the transceiver of the first device 232 and the receiver unit in the receiver of the second device 234. The power dividers 228(1) and 228(2) are two-way 3-dB equal power dividers; the power divider 228(1) splits the power of the sum signal S evenly between the phase-sensing comparator 229 and the transceiver 232, while the power divider 228(2) splits the power of the difference signal D evenly between the phase-sensing comparator 229 and the receiver of the second device 234. The phase-sensing comparator 229 calculates a polarity data P based on the comparison of polarities of the difference signal D and sum signal S, which is in turn delivered to the second device 234 for DOA Estimation. The second device 234, upon receiving the difference signal D and the polarity data P, estimates the direction-of-arrival (DOA) by correlating the difference signal D to the polarity data P:

$$DOA = P \times D \qquad (1)$$

After calculating the DOA of the incoming signal, the digital subsystem 230, particularly, the second device 234, calculates weights that are fed back to step leveling devices 220, and continues to update a beam pattern formed by the two RF signals (i.e. weights) until DOA approaches null. For clarity, the phrase "DOA approaches null" is later re-defined in FIG. 5C.

Figure 3A:
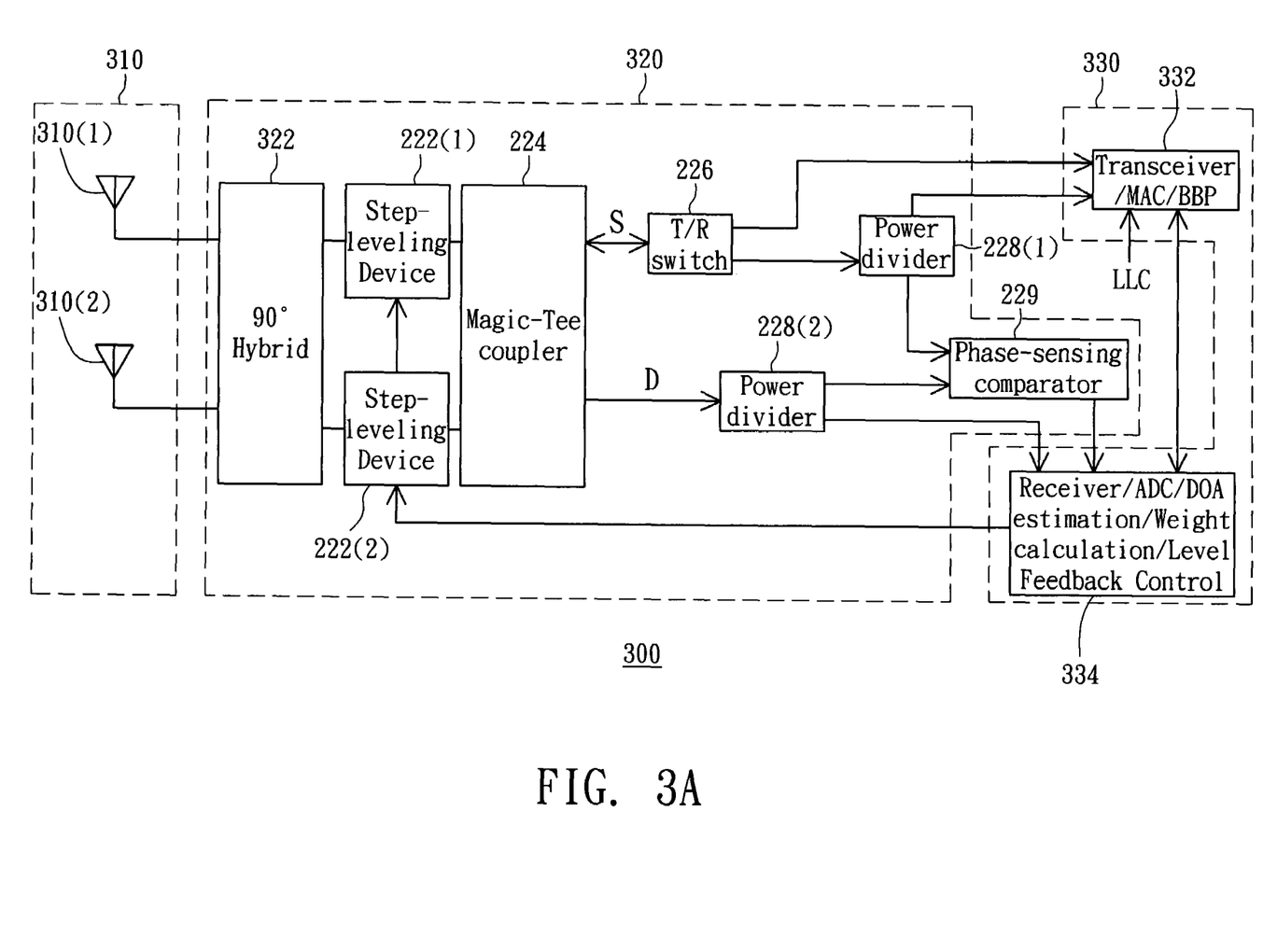
FIG. 3A shows illustration of a hybrid wireless device according to a second embodiment of the invention.

Alternatively, the antenna array can be a phased antenna array instead of the amplitude-compared array in the first embodiment. FIG. 3A shows illustration of a hybrid wireless device with a phased antenna array according to a second embodiment of the invention. The hybrid wireless device 300 includes a phased antenna array 310, an analog subsystem 320 and a digital subsystem 330. As distinguished from FIG. 2, the analog subsystem 320 further includes a microwave-coupling unit, such as a 90° hybrid coupler 322. The 90° hybrid coupler 322 converts the phase components of the two RF signals received via the antenna elements 310(1) and 310(2) into amplitude components, which then can be further processed by the magic-tee coupler 224 to generate the sum signal S and the difference signal D.

Figure 3B:
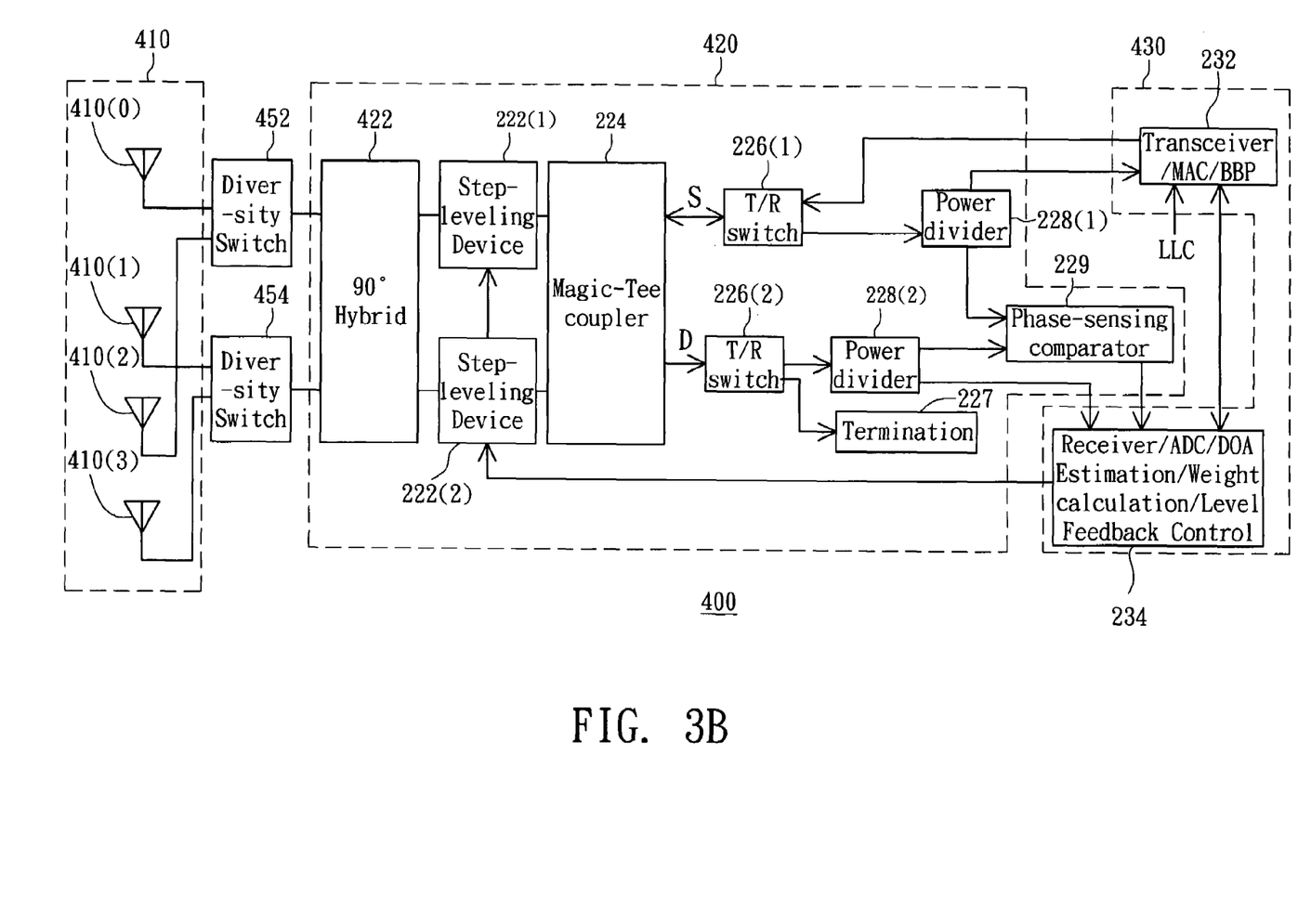
FIG. 3B shows illustration of a hybrid wireless device according to the third embodiment of the invention.

Optionally, the antenna array can include more than one antenna element pair to extend link range. FIG. 3B shows illustration of a hybrid wireless device according to a third embodiment of the invention. The wireless device 400, as distinguished from wireless device 300, further includes diversity switches 452 and 454 for selection switching among the antenna elements of the antenna array 410, which in this particular embodiment, includes four antenna elements 410(0)~410(3), or equivalently, two antenna element pairs. The diversity switch 452 can switch between stronger of the two inputs received via antenna elements 410(0) and 410(2), while diversity switch 454 switch between stronger of the two inputs received via antenna elements 410(1) and 410(3). The analog subsystem 420 includes two T/R switches 226(1) and 226(2). The T/R switch 226(2) performs time-division-duplexing between the power divider 228(2) and a termination 227.

Figure 4:
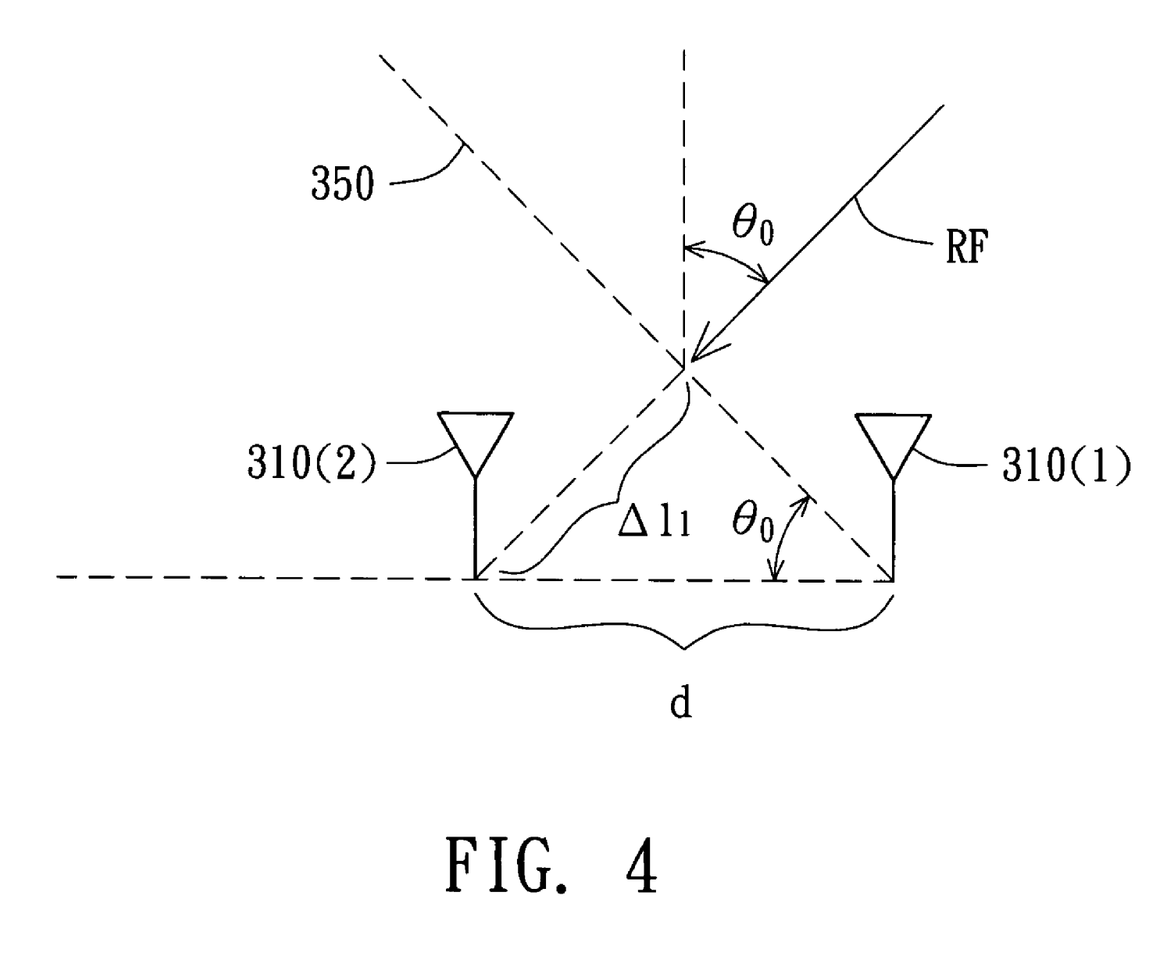
FIG. 4 illustrates the direction of arrival of a propagating wave incident to the phase-comparison antenna elements 210(0) and 210(1).

In addition to the DOA estimation introduced in function (1), the DOA can be calculated from phase difference of two antenna elements of the phased antenna array, based on the mathematical relationship between phase difference and DOA. A spacing in distance exists between the two phased antenna elements 310(1) and 310(2) of the phased antenna array 310 of two equal gains, as defined in FIG. 4. FIG. 4 illustrates the direction of arrival of a propagating wave incident to the phased antenna elements 310(1) and 310(2). The phased antenna elements 310(1) and 310(2) are separated by a spacing d. The incoming signal RF has a wave front 350 arriving first at the first antenna element 310(1) from direction $\theta_0$. Then, after traveling an extra path distance, $\Delta l_1$, the incoming signal arrives at the second antenna element 310(2). The path difference $\Delta l_1$ results in a phase difference $\Delta \Phi$ between the antenna elements:

$$\Delta\phi = \frac{2\pi \times \Delta l_1}{\lambda} = \frac{2\pi \times d \times \sin\theta_0}{\lambda} \qquad (2)$$

wherein $\Delta l_1 = d \times \sin\theta_0$, and $\lambda$ (lambda) is the wavelength of the channel center frequency. Given the pre-arranged spacing d between the antenna elements 310(1) and 310(2), the incoming signal generated from a far station (not shown) by a client can thus be located via radio source direction-finding approach i.e. by calculating the DOA of an incoming signal ($\theta_0$) from the phase difference $\Delta\Phi$:

$$\theta_0 = \sin^{-1}\left(\frac{\Delta\phi \times \lambda}{2\pi \times d}\right) \qquad (3)$$

Figure 5A:
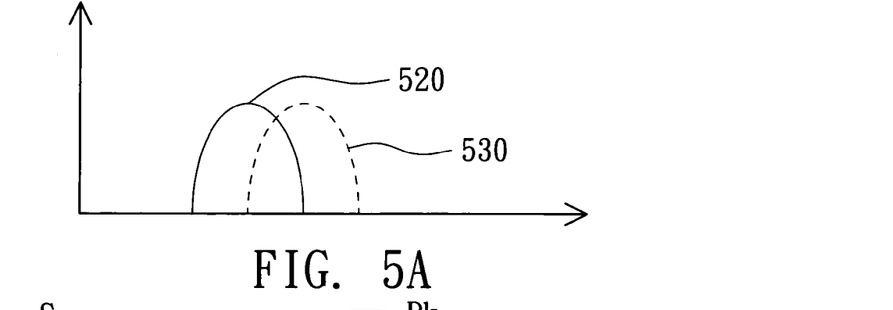
FIG. 5A shows beam patterns of antenna arrays.
Figure 5B:
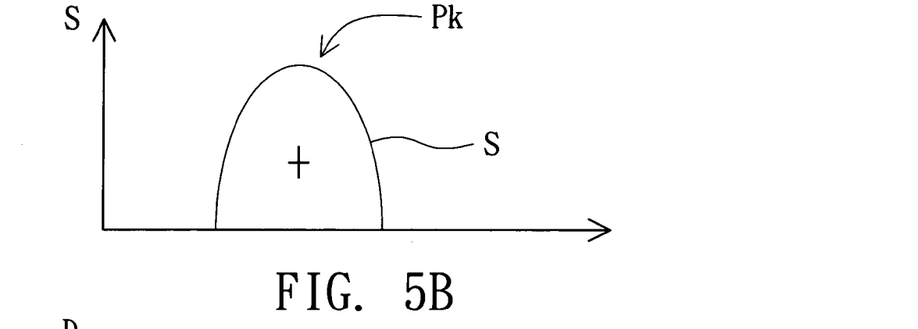
FIG. 5B shows the sum of the beam patterns 520 and 530 for the generation of the sum signal S.
Figure 5C:
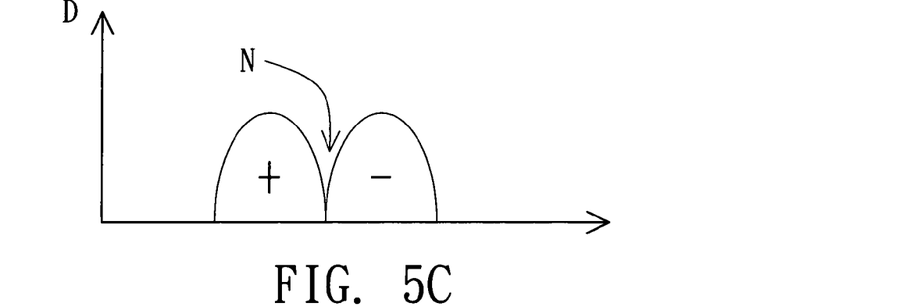
FIG. 5C shows the difference of the beam patterns 520 and 530 for the generation of the difference signal D
Figure 5D:
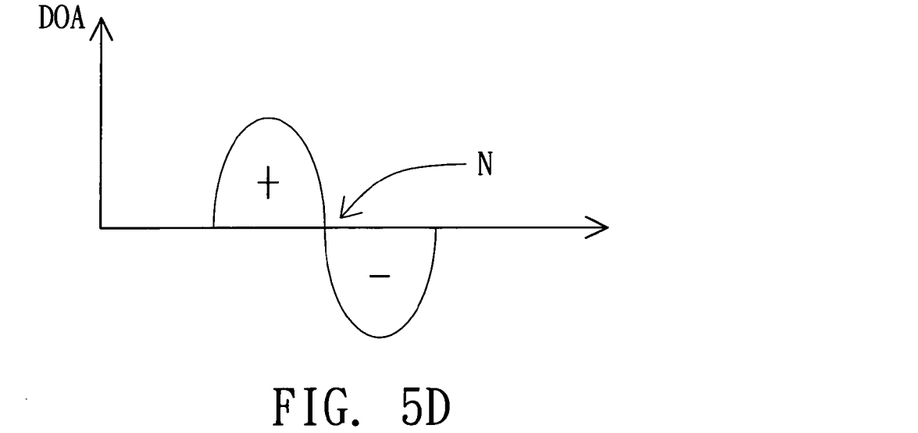
FIG. 5D shows the ratio of difference signal D and sun signal S, that is, DOA.

FIG. 5A-5D illustrate waveforms of estimating DOA via the sum signal S and the difference signal D by the operation of the Magic-Tee coupler 224. FIG. 5A shows dual overlapped bell-curves of beam patterns 520 and 530 of the antenna array. FIG. 5B shows the sum of the beam patterns 520 and 530 for the generation of the sum signal S with single bell-curve pattern. FIG. 5C shows the difference of the beam patterns 520 and 530 for the generation of the difference signal D with an M-curve pattern. FIG. 5D shows the ratio of difference signal D and sum signal S, that is, DOA with an S-curve pattern.

The peak Pk of the sum of the individual beams 520 and 530 can be steered directly towards a client so as to optimize signal strength of the incoming signal, as shown in FIG. 5B. Alternatively, a more accurate approach for maximizing strength of signals originating from client (not shown) is to steer the null N observed in the difference signal D in the direction in line with the client, as shown in FIG. 5C.

Hence, referring back to FIG. 2, the weights are continuously generated by the second device 234 and fed back to the step leveling devices 220, and the beam pattern is updated until DOA of the incoming signal approaches null.

Figure 6:
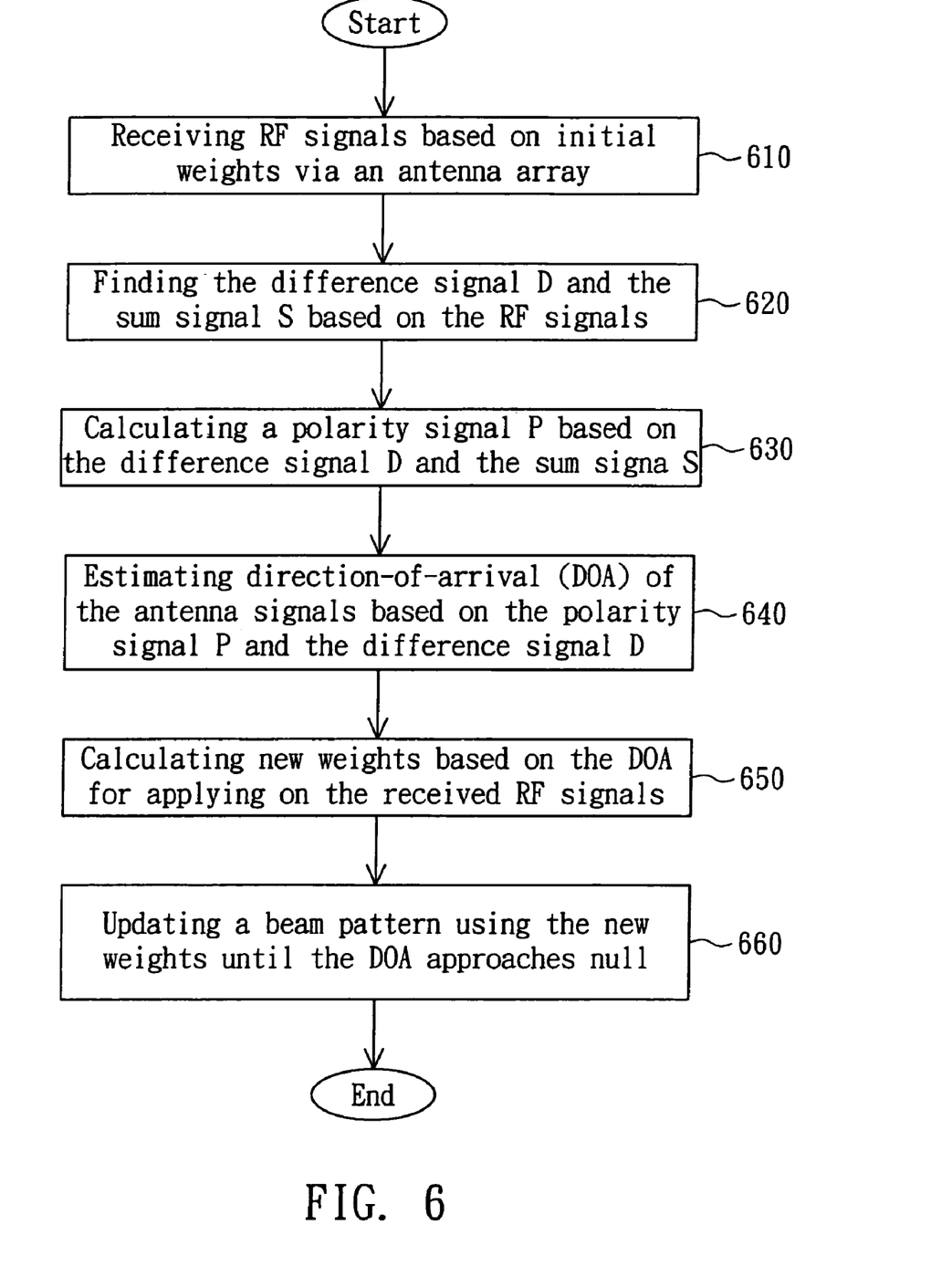
FIG. 6 illustrates a flowchart of a method for steering antenna beam according to a preferred embodiment of the invention.

FIG. 6 illustrates a flowchart of a method for steering antenna beams. The method is applied to a hybrid wireless device, such as one shown in FIG. 2. The method begins by receiving RF signals based on initial weights via the antenna array 210, as shown in step 610. Then, a difference signal D and a sum signal S are calculated based on amplitudes of the two RF signals, indicated by step 620. Next, a polarity data P is derived based on the difference signal and the sum signal, as shown in step 630, upon which the direction-of-arrival (DOA) of the RF signals is estimated based on the polarity data P and the difference signal D, as shown in step 640, by correlating the difference signal D to the polarity data P. After the DOA has been estimated, then new weights are calculated based on the DOA, and applied on the two RF signals, as shown in step 650. Then, a beam pattern formed by the two RF signals is continuously weighted using newly updated weights until the DOA approaches null, as shown in step 660.

Figure 7:
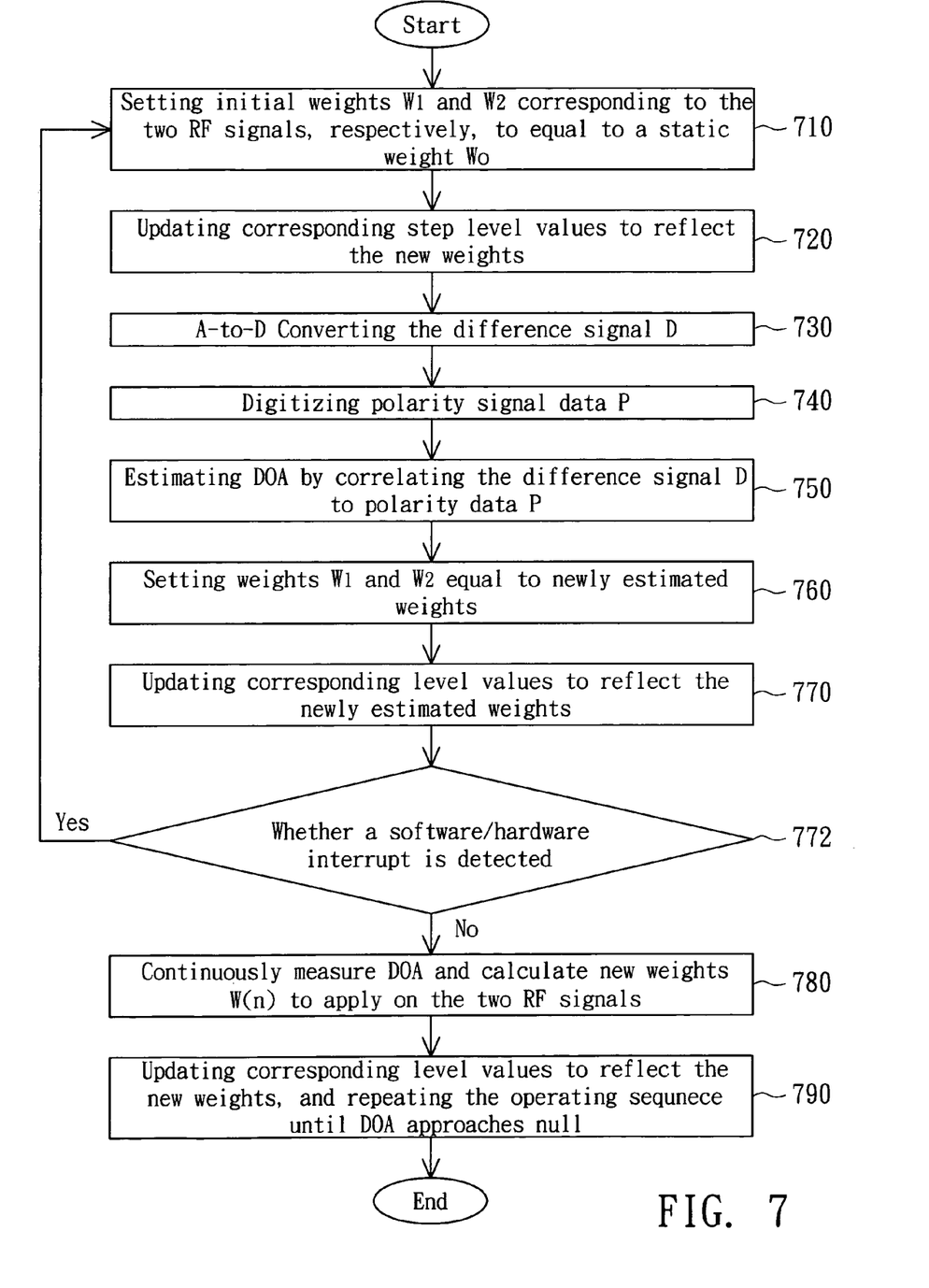
FIG. 7 shows a flowchart of the steps in DOA estimation, weight calculation and level feedback control.

FIG. 7 shows a flowchart of the steps of DOA estimation, weight calculation and level feedback control. These steps are divided into a training (DOA estimation) sequence and an operating (DOA calculation) sequence. In the beginning of the training sequence, the initial weights $W_1$ and $W_2$ corresponding to the two RF signals received by the antenna elements 210(0) and 210(1), respectively, are set to equal to a static weight Wo, as shown in step 710. Then, the corresponding step level values of the step leveling devices 222(1) and 222(2) are updated to reflect the new weights, as shown in step 720. Once the weights are updated, the difference signal D is A-to-D converted, indicated by step 730. The polarity data P received from the phase-sensing comparator 229 is also being digitized, as shown in step 740. Preferably, P is digitized to correspond to either the state of +1 or −1. Then, the DOA is estimated by correlating the quantized difference signal D to the two-state polarity data P, indicated by step 750. Next, in step 760, the weights $W_1$ and $W_2$ corresponding to the two RF signals received by the antenna elements 210(0) and 210(1), respectively, are set to equal to newly estimated weights:

$$W_1(2) = W_1(1) \times 10^{(+S \times DOA)} \quad (4\text{-}1)$$

$$W_2(2) = W_2(1) \times 10^{(-S \times DOA)} \quad (5\text{-}1)$$

where $W_1(2)$ and $W_2(2)$ are the newly estimated weights, and $W_1(1)$ and $W_2(1)$ are the initial static weights, and S is a parameter related to feedback loop gain and time constant. Then, the corresponding level values of the step leveling devices 222(1) and 222(2) are updated to reflect the newly estimated weights $W_1(2)$ and $W_2(2)$, as shown in step 770, thereby completing the training sequence. Next, step 772 is performed to determine whether to proceed to the operating sequence, such as determining whether a software/hardware interrupt is detected, if yes, then step 710 is returned.

If else, then entering the operating sequence, step 780 is performed to continuously measure DOA and calculate new weights W(n) to apply to the two RF signals, where the new weights W(n) are found by multiplying the previous weights W(n−1) by a factor $10^{(+S \times DOA)}$, according to the following:

$$W_1(n) = W_1(n-1) \times 10^{(+S \times DOA)} \quad (4\text{-}2)$$

$$W_2(n) = W_2(n-1) \times 10^{(-S \times DOA)} \quad (5\text{-}2)$$

Afterwards, the corresponding level values of the step leveling devices 222(1) and 222(2) are then updated to reflect the new weights $W_1(n)$ and $W_2(n)$, as shown in step 790, and the operating sequence is repeated until the DOA approaches null. Once the DOA approaches null, as determined by step 790, the operating sequence is therefore complete and the training sequence is returned.

As mentioned, the antenna array includes at least two antenna elements. In some embodiments, the antenna array can further be extended to 4 elements, 6 elements, or 2n, where n are positive integers greater than 2. To support the added antenna elements, the number of corresponding elements, including hybrid couplers, step-leveling devices (SLD), magic-tee couplers, and multiplexers (such as power dividers or switches) need to be increased.

Figure 8:
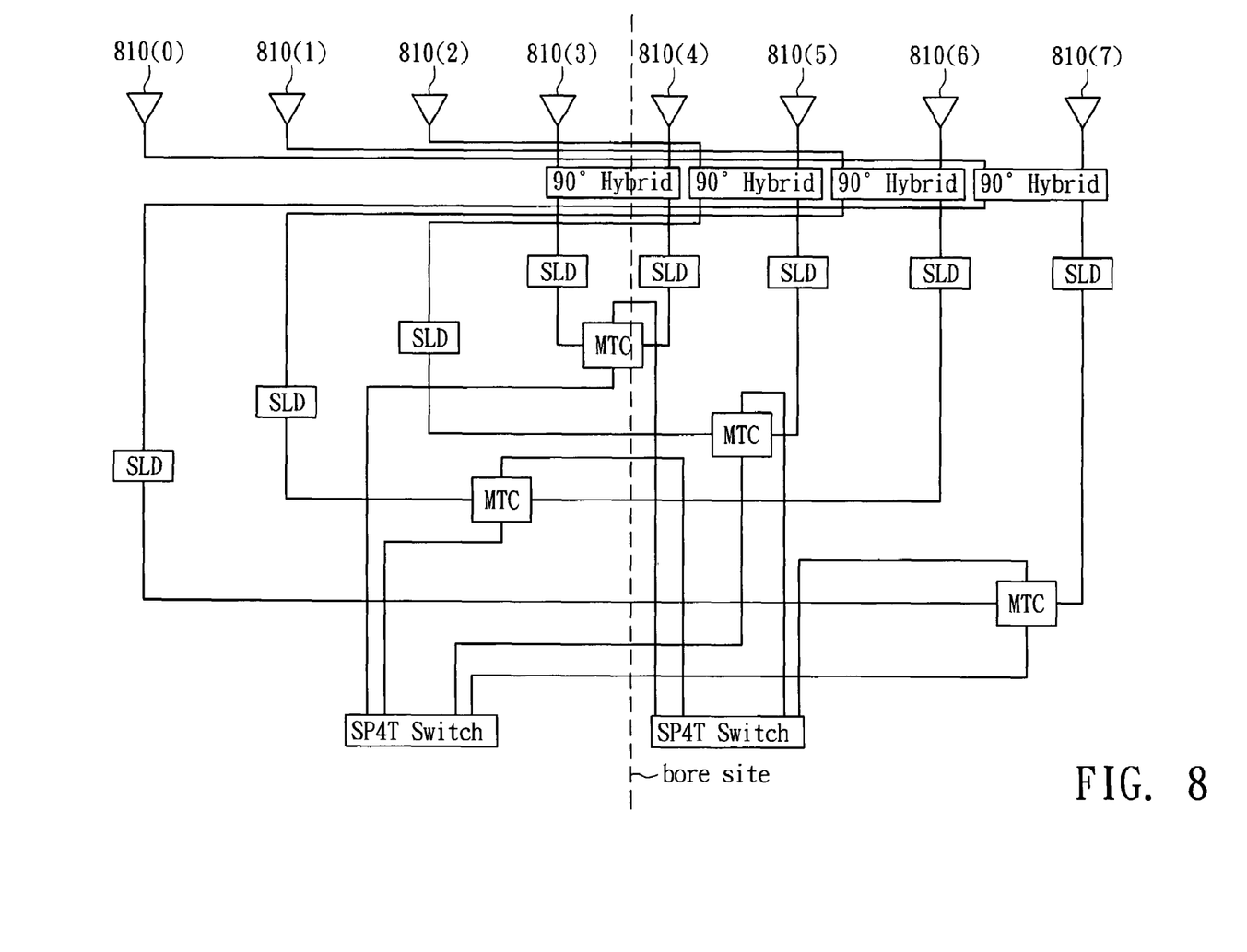
FIG. 8 shows a phase-comparison antenna array with multiple antenna element pairs according to an embodiment of the invention.

FIG. 8 shows a phase-comparison antenna array with multiple antenna element pairs according to an embodiment of the invention. In this particular embodiment, the antenna array include eight antenna elements 810(0)~810(7). Four 90° hybrid couplers, as well as eight step leveling devices (SLD), four magic-tee couplers (MTC) and two single-pole-quadruple-throw (SP4T) switches are also used in conjunction. FIG. 8 intends to show how an antenna array with multiple antenna element pairs can be realized, and any addition (or reduction) of antenna elements beyond (or under) eight can be easily implemented by a person skilled in the art.

Figure 9:
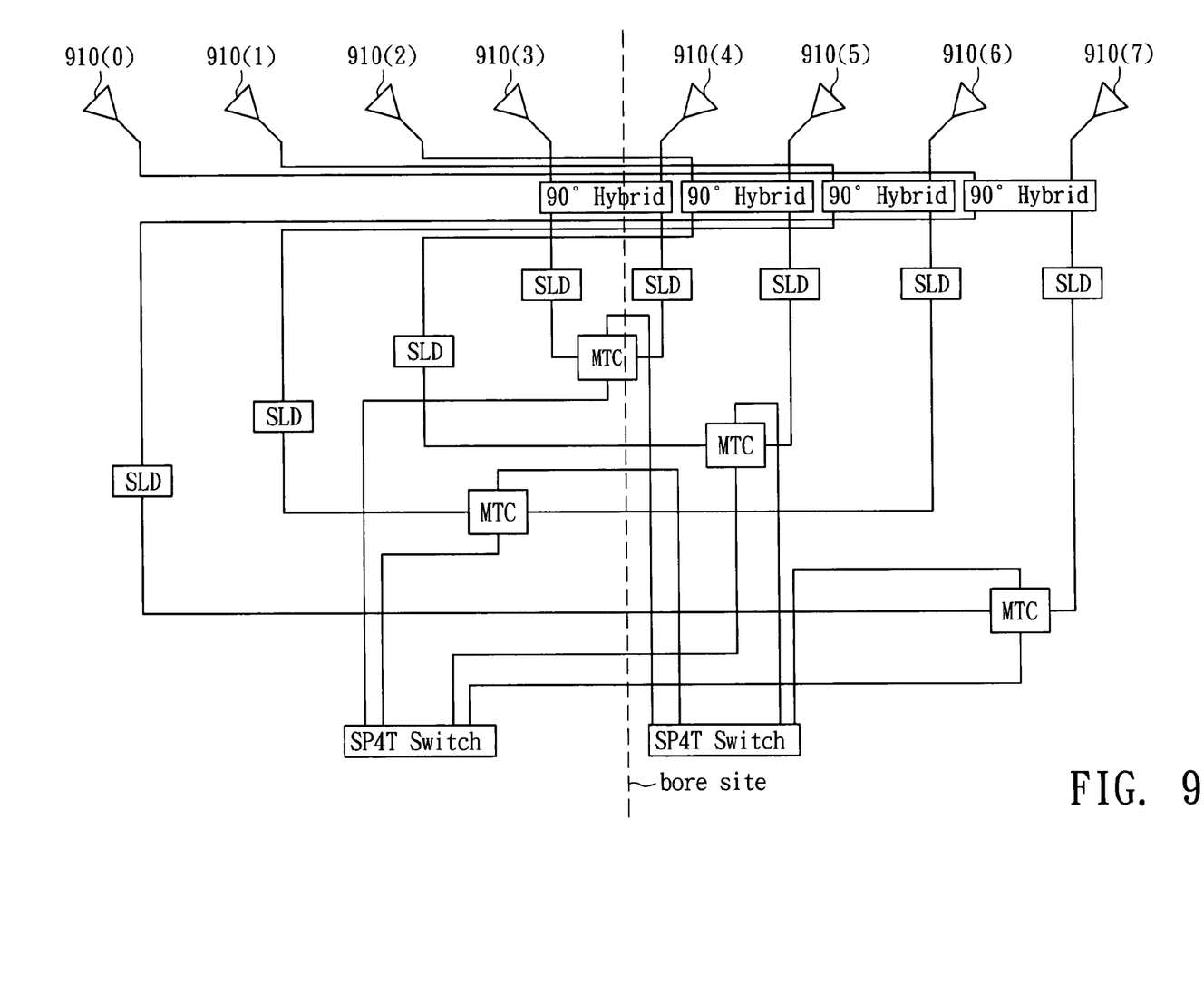
FIG. 9 shows an amplitude-compared antenna array with multiple antenna element pairs according to another embodiment of the invention.

FIG. 9 shows a corresponding upgrade to the antenna array (amplitude-compared array) of FIG. 2 to incorporate multiple antenna element pairs. The antenna array in FIG. 9 is shown with 8 antenna elements, or 4 antenna element pairs. The individual sum signals Σ(sigma) and signals Δ(delta) are multiplexed by the SP4T switch to output sum signals S and difference signal D, respectively.

In a multiple antenna element pair array such as shown in FIGS. 8 and 9, the antenna element pairs are symmetrically disposed with respect to an array bore site (i.e. center line of the antenna array) such that an antenna element to the left of the bore site has a corresponding antenna element to the right of the bore site, thus forming an antenna element pair.

A coarse-fine mechanism of such antenna array can thus be implemented to compare the antenna elements in pairs symmetrically with respect to the array bore site. In principle, the comparisons between outer antenna element pairs determines accuracy, and the comparisons between inner antenna element pairs determines ambiguity, provided that antenna elements and antenna element pairs are properly aligned, and the spacing or squint-angle are optimally matched with the wavelength and beamwidth, respectively. In other words, choosing an outer antenna element pair increases the field of view, while choosing an inner antenna element pair decreases the ambiguity in direction finding.

Figure 10A:
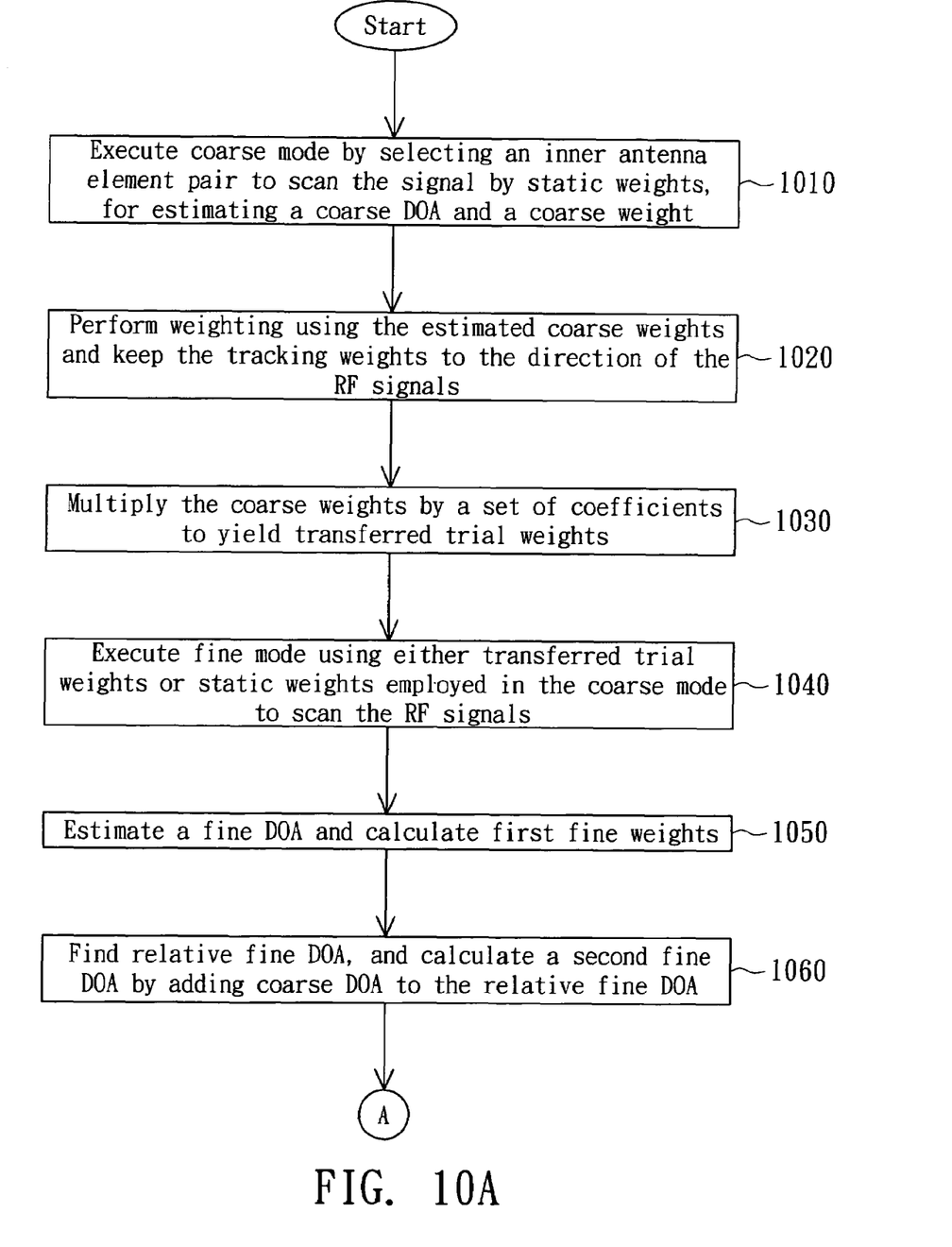
FIGS. 10A and 10B show a method of antenna selection for a multiple-antenna-element array according to an embodiment of the invention.
Figure 10B:
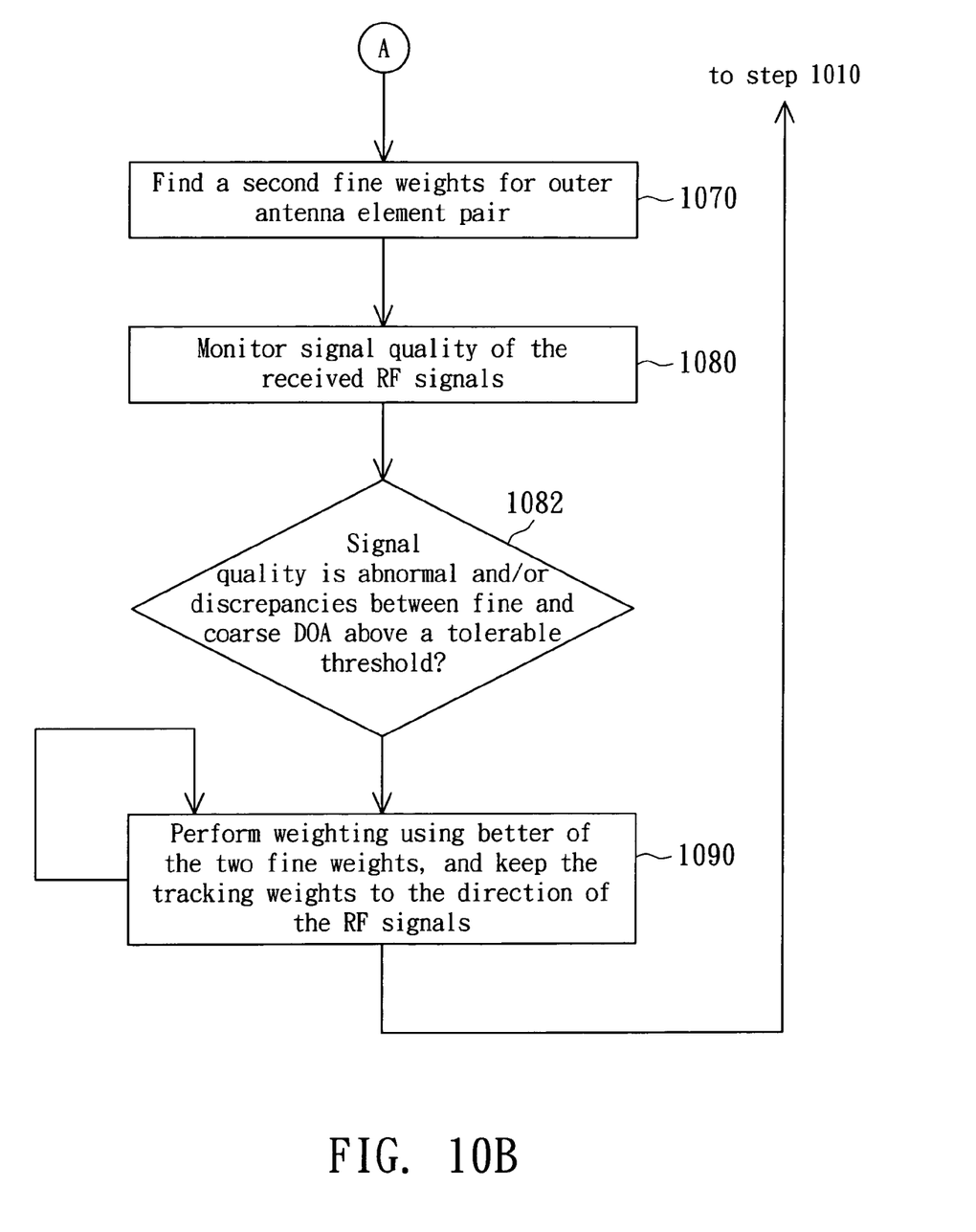

The embodiments of the invention thus intend to provide a coarse-fine approach implemented with multiple-antenna-element pair-array, in which both accurate and non-ambiguous DOA measurements can be achieved. The coarse mode refers to selecting an inner antenna element pair to find DOA and weights, and the fine mode refers to selecting an outer antenna element pair to find DOA and weights. FIGS. 10A and 10B show the flowchart of a method of antenna selection for a multiple-antenna-element array according to an embodiment of the invention. The method primarily performs at least one of a coarse mode and a fine mode to calculate weights and applies the weights to RF signals received by the antenna array, so as to locate a direction of arrival (DOA) of the RF signals.

The method of antenna selection is applied in a hybrid wireless device such as one shown in FIG. 2. If the hybrid wireless device is to first operate in the coarse mode, the method begins in step 1010 by selecting an inner antenna element pair closer to the bore site to scan the signal by static weights, in which a coarse DOA and a coarse weight is estimated. Then, perform step 1020 to do weighting by using the estimated coarse weights, and keep the tracking weights to the direction of the arriving RF signals until the DOA approaches null.

If the mode of operation is switched to fine mode, then a preliminary step is conducted by multiplying the coarse weights by a set of coefficients, yielding a plurality of transferred trial weights for applying in an outer antenna element pair, as indicated by step 1030.

Under the fine mode, weights, or fine weights for distinction, can be determined in two ways. First, fine weights are determined by steps 1040 and 1050, and second fine weights are determined by step 1060 and 1070, and eventually, a better of the two fine weights is utilized, as discussed below in further detail.

The fine mode is executed by either using the available transferred trial weights to scan the RF signal, or using the same static weights employed in the coarse mode to scan the RF signal, as indicated by step 1040 and 1060, respectively. Then, in the step following 1040, a fine DOA is estimated and a set of first fine weights are calculated, indicated by step 1050. Alternatively, in step 1060, a relative fine DOA is found, and a second fine DOA is then calculated by adding the previously calculated coarse DOA to the relative fine DOA. Thereafter, corresponding second fine weights are found from and for that outer antenna element pair, indicated by step 1070. Then, step 1080 is performed to monitor signal quality of the received RF signals, and the coarse mode is returned if the signal quality is abnormal and/or discrepancies exist between the fine DOA and the coarse DOA and the discrepancies are above a tolerable threshold, as indicated by step 1082: if yes, step 1010 is returned, else step 1090 is performed. If none of said conditions hold, i.e. no abnormalities and no discrepancies, then step 1090 is executed to perform weighting using better of the two fine weights (i.e. first and second fine weights), and keep the tracking weights to the direction of the RF signals until DOA approaches null.

Conclusively, by combining a coarse mode and a fine mode direction finding approach as described above, the DOA can be located utilizing an optimized field of view with little direction finding ambiguity, and precisely locating the DOA leads to an increase in link range.

Also, by applying the hybrid wireless device and the method of locating RF signal according to the embodiments of the invention in adaptive direction finding, adaptive weight calculation, and level feedback control for weighting, precise DOA can be located, and beam formation can be precisely tuned to point to the direction of the source, thereby maximizing signal to noise ratio.

While the invention has been described by way of examples and in terms of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A hybrid wireless network system for steering antenna beams, comprising:
    an antenna array, receiving at least two RF signals;
    an analog subsystem comprising:
        a step leveling device coupling to the antenna array;
        a magic-Tee coupler connected to the step leveling device for calculating a difference signal and a sum signal based on the two RF signals; and
        a phase-sensing comparator for calculating a polarity data based on the comparison of the difference signal and the sum signal; and
    a digital subsystem comprising a transceiver and a receiver, estimating a direction-of-arrival (DOA) based on the difference signal and the polarity data, and generating weights based on the DOA; and
    wherein the step-leveling device receive the weights from the digital subsystem, in form of a feedback control, to apply the weights on the two RF signals respectively;
    wherein the digital subsystem repetitively calculates new weights to update a beam pattern of the antenna array until the DOA approaches null.

2. The system according to claim 1, wherein the antenna array comprises amplitude-compared antenna elements.

3. The system according to claim 1, wherein the antenna array comprises phased antenna elements, the analog subsystem further comprising:
    a microwave coupling unit (90° hybrid coupler), for converting phase signals received by the phase-comparison antenna elements into amplitude signals.

4. The system according to claim 1, wherein the digital subsystem further comprises:
    a media access control (MAC) connected to the transceiver; and
    a baseband processor (BBP) connected to the MAC for processing signals to and from a network via the antenna array.

5. The device according to claim 1, wherein the DOA is calculated by correlating the difference signal to the polarity data.

6. The device according to claim 1, wherein the antenna array has two antenna elements.

7. The device according to claim 6, wherein the analog subsystem further comprises a diversity switch connected between the antenna array and the step leveling device for selectively connecting one of the antenna elements to the step leveling device.

8. The device according to claim 7, wherein the device further comprising an additional antenna array to extend link coverage.

9. A method for steering antenna beams of a hybrid wireless network system comprising an antenna array, an analog subsystem and a digital subsystem, the method comprising:
    receiving at least two RF signals based on initial weights applied by the analog subsystem via the antenna array;
    calculating a difference signal and a sum signal based on amplitudes of the two RF signals by a magic-Tee coupler of the analog subsystem;
    calculating a polarity data based on the difference signal and the sum signal by a phase-sensing comparator of the analog subsystem; and
    estimating direction-of-arrival (DOA) of the RF signals based on the polarity data and the difference signal by the digital subsystem.

10. The method according to claim 9, wherein the polarity data is calculated based on the comparison of polarities of the difference signal and the sum signal by the phase-sensing comparator of the analog subsystem.

11. The method according to claim 9, wherein the difference signal is correlated to the polarity data to generate the estimated DOA by the digital subsystem.

12. The method according to claim 9, further comprising:
    calculating new weights for the two RF signals based on the DOA by the digital subsystem; and continuously updating the antenna beams by the digital subsystem using the new weights via virtue of feedback to the analog subsystem until the DOA approaches null.

13. The method according to claim 9, wherein the antenna array comprises antenna element pairs that are symmetrically disposed with respect to an array bore site such that an antenna element to the left of the bore site has a corresponding antenna element to the right of the bore site, the method further comprising:

performing at least one of a coarse mode and a fine mode by the digital subsystem to calculate weights and apply the weights to RF signals received by the antenna array, so as to locate a direction of arrival (DOA) of the RF signals;

wherein the coarse mode comprises the analog subsystem selecting an inner antenna element pair closer to the bore site such that the digital subsystem is able to calculate coarse weights; and wherein the fine mode comprises the analog subsystem selecting an outer antenna element pair farther from the bore site such that the digital subsystem is able to calculate fine weights.

14. The method according to claim 13, wherein the fine weights are calculated by the digital subsystem based on multiplying the coarse weights by a set of coefficients.

15. The method according to claim 13, wherein the fine weights are calculated by the digital subsystem based on the outer antenna element pair and the coarse weights.

16. The method according to claim 13, wherein the coarse weights and the fine weights each comprise tracking weights, the method further comprising:

checking if signal quality of the RF signals is abnormal under current mode of operation by the digital subsystem, if yes, switching the current mode of operation, the current mode of operation being either the coarse mode or the find mode; and if the signal quality is not abnormal, applying the calculated weights by the analog subsystem under the current mode of operation and keeping the tracking weights to the direction of the RF signals by digital subsystem.

* * * * *

UNITED STATES PATENT AND TRADEMARK OFFICE
CERTIFICATE OF CORRECTION

PATENT NO.      : 7,613,482 B2                                    Page 1 of 1
APPLICATION NO. : 11/296441
DATED           : November 3, 2009
INVENTOR(S)     : I-Ru Liu It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 999 days.

Signed and Sealed this

Nineteenth Day of October, 2010

David J. Kappos
*Director of the United States Patent and Trademark Office*